United States Patent [19]

Doshi et al.

[11] 4,340,398

[45] Jul. 20, 1982

[54] PRESSURE SWING ADSORPTION RECOVERY

[75] Inventors: Kishore J. Doshi, Mahopac; Kirit M. Patel, Wappingers Falls, both of N.Y.

[73] Assignee: Union Carbide Corporation, Danbury, Conn.

[21] Appl. No.: 265,659

[22] Filed: May 20, 1981

[51] Int. Cl.³ .............................................. B01D 53/04
[52] U.S. Cl. ............................................ 55/25; 55/58; 55/62; 55/74; 55/75; 55/179; 55/387; 55/389
[58] Field of Search ................... 55/25, 26, 62, 68, 74, 55/75, 179, 180, 387, 389, 58

[56] References Cited

U.S. PATENT DOCUMENTS

| | | | |
|---|---|---|---|
| 3,085,379 | 4/1963 | Kiyonaga et al. | 55/62 X |
| 3,142,547 | 7/1964 | Marsh et al. | 55/26 |
| 3,176,444 | 4/1965 | Kiyonaga et al. | 55/26 X |
| 3,225,518 | 12/1965 | Skarstrom et al. | 55/62 X |
| 3,226,914 | 1/1966 | Griesmer et al. | 55/62 X |
| 3,430,418 | 3/1969 | Wagner | 55/25 |
| 3,788,036 | 1/1974 | Lee et al. | 55/25 |
| 3,891,411 | 6/1975 | Meyer | 55/26 |
| 3,977,845 | 8/1976 | Walter | 55/25 |
| 3,986,849 | 10/1976 | Fuderer et al. | 55/25 |
| 4,160,651 | 7/1979 | Pivard | 55/26 |

Primary Examiner—Robert H. Spitzer
Attorney, Agent, or Firm—Alvin H. Fritschler

[57] ABSTRACT

Void space gas is released from an adsorbent bed at a higher adsorption pressure by cocurrent depressurization of the bed. The released gas is passed to another bed of a pressure swing adsorption system to equalize the pressure therebetween, the other bed being initially at a lower pressure. A portion of the product effluent withdrawn from yet another bed of the system is not passed to the bed undergoing repressurization, as in conventional practice, but is passed to an external repressurization storage tank during said pressure equalization step. Upon completion of this step, the product effluent is withdrawn from the repressurization tank and passed to said bed undergoing repressurization.

22 Claims, 1 Drawing Figure

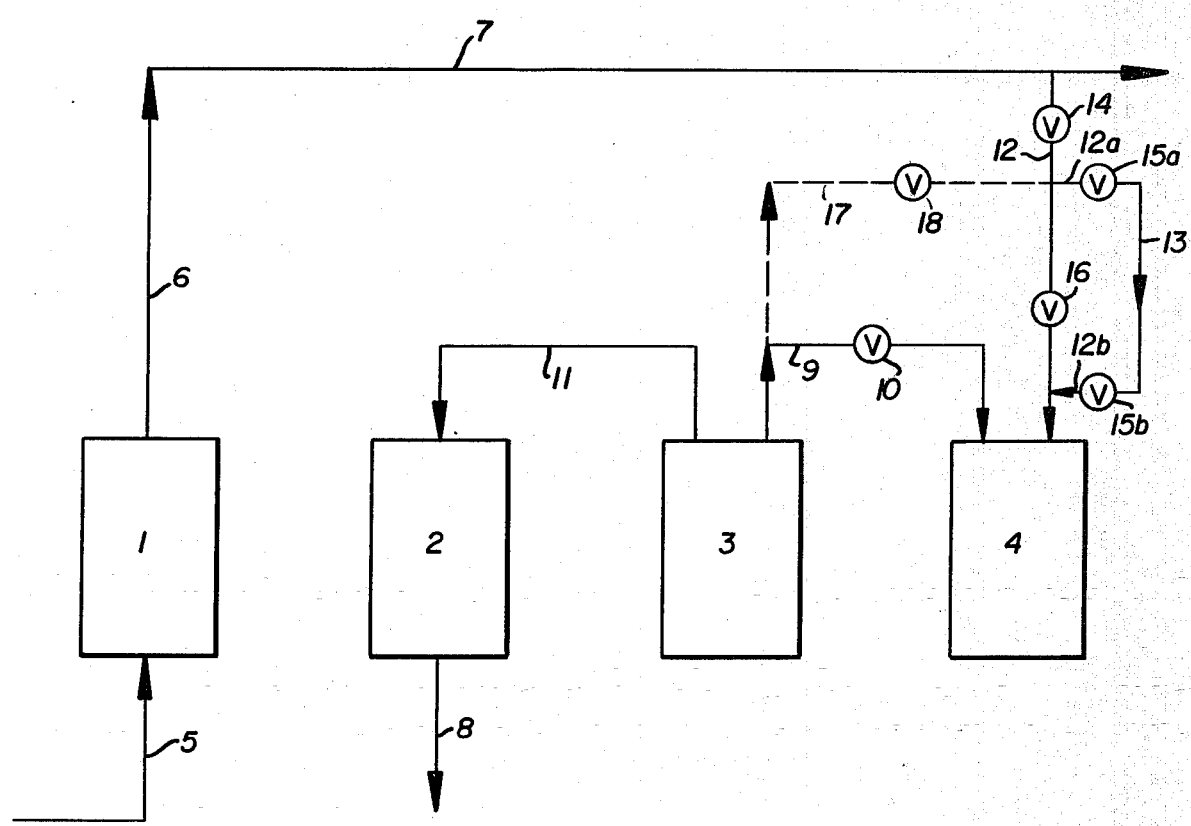

PRESSURE SWING ADSORPTION RECOVERY

BACKGROUND OF THE INVENTION

1. Field of the Invention

The invention relates to the purification of gases in a pressure swing adsorption system. More particularly, it relates to the improvement of product gas recovery in such a system.

2. Description of the Prior Art

The pressure swing adsorption (PSA) process provides a highly desirable means for separating and purifying at least one gas component from a feed gas mixture of said gas component and at least one selectively adsorbable component. Adsorption occurs in an adsorbent bed at a higher adsorption pressure, with the selectively adsorbable component thereafter being desorbed by pressure reduction to a lower desorption pressure. The PSA process is commonly employed in multi-bed systems. The Wagner patent, U.S. Pat. No. 3,430,418, discloses a PSA process and system employing at least four adsorption beds arranged for carrying out the PSA processing sequence on a cyclic basis. This sequence includes higher pressure adsorption, cocurrent depressurization to intermediate pressure with release of void space gas from the product end of the bed, countercurrent depressurization to a lower desorption pressure, and repressurization to the higher adsorption pressure. Wagner teaches the passing of the released void space gas from one bed directly to another bed initially at its lower desorption pressure. The pressure in the two beds is thereby equalized at an intermediate pressure, after which additional void space gas is released from the one bed as it is depressurized to a lower pressure. The other bed is further repressurized from the intermediate pressure to its higher adsorption pressure at least in part by the countercurrent addition of product effluent to the product end of the bed being repressurized.

In a further development of the art, the Fuderer patent, U.S. Pat. No. 3,986,849, discloses the use of at least seven adsorbent beds, with the feed gas mixture being introduced to the feed end of at least two adsorbent beds, in overlapping identical processing cycles, at all stages of the PSA processing sequence. It is known in the art that advantages can be achieved in particular embodiments by employing a second pressure equalization step in addition to that referred to above. By such a step, a bed undergoing repressurization is further pressure equalized with the void space gas from another bed to a higher intermediate pressure subsequent to the pressure equalization of the bed from its initial desorption pressure to an initial intermediate pressure. In accordance with the Fuderer teaching, each bed, in turn, undergoes three pressure equalization steps prior to final repressurization to the higher adsorption pressure. Fuderer also discloses the carrying out of the three pressure equalization steps in a particular manner to achieve higher product purity by substantially avoiding the impurity profile reversion that can occur upon pressure equalization between the beds, as discussed in the patent. It is also within the contemplation of the art to employ, in some circumstances, a fourth pressure equalization step prior to final repressurization with product effluent.

The PSA process is generally carried in multibed systems so as to provide a substantially uniform flow of product effluent from the adsorption system. A portion of the product effluent withdrawn from a bed or beds undergoing adsorption at higher pressure is employed for repressurization of other beds of the system. As is taught by Wagner, the last part of the repressurization is performed only with the product effluent. To avoid any discontinuity in the substantially uniform flow of product effluent in the product manifold leading from the overall PSA system, it is conventional practice to continually withdraw a portion of the product effluent for repressurization purposes.

As a result of the repressurization of the bed initially at lower pressure simultaneously by both product effluent gas and void space gas released from another bed, it has been recognized that a somewhat lower recovery of product is achieved than would result in the event such simultaneous repressurization were not required in practical commercial operations. This effect becomes more pronounced at the appreciably higher repressurization rates applicable as the number of beds in the PSA system is increased, resulting in an increase in the amount of product gas unrecovered from each bed and subsequently lost upon countercurrent depressurization and purge. Such a loss of product gas, while tolerable in light of the overall requirements of commercial embodiments of the PSA process and system, is nevertheless undesired, and its avoidance would present a further advance in the art.

It is an object of the invention, therefore, to provide an improved PSA process and system.

It is another object of the invention to provide a PSA process and system having improved product recovery.

With these and other objects in mind, the invention is hereinafter described in detail, the novel features thereof being particularly pointed out in the appended claims.

SUMMARY OF THE INVENTION

During pressure equalization between a bed undergoing cocurrent depressurization with release of void space gas and a bed initially at a lower pressure, a portion of the product effluent withdrawn from a bed at higher adsorption pressure is passed to an external repressurization tank. This product effluent is passed to the bed undergoing repressurization upon completion of the passage of said void space gas to said bed during said pressure equalization. In addition a portion of the released void space gas can be passed to the repressurization tank. This portion of said gas, together with product effluent, is passed into the bed undergoing repressurization subsequent to the introduction of the remaining released void space gas directly into said bed undergoing repressurization.

BRIEF DESCRIPTION OF THE DRAWING

The invention is hereinafter described in detail with reference being made to the accompanying single FIGURE drawings of a diagrammatic flowsheet illustrating the practice of the invention in multi-bed PSA systems.

DETAILED DESCRIPTION OF THE INVENTION

The objects of the invention are accomplished by passing product effluent being used for repressurization into an external repressurization storage tank during pressure equalization of a bed initially at a lower pressure and undergoing repressurization. Upon completion of the pressure equalization step, the product effluent is passed from the repressurization tank to the bed being repressurized. The recovery of product gas from a PSA system incorporating this feature can be improved over a conventional system having simultaneous pressure equalization and repressurization with product effluent.

The invention is illustrated in the drawing with reference to a PSA system shown with four adsorbent beds. In the drawing, bed 1 is undergoing adsorption, bed 2 is undergoing countercurrent depressurization to lower desorption pressure, and bed 3 is undergoing cocurrent depressurization with the release of void space gas to bed 4, which is initially at a lower pressure and is undergoing repressurization. A feed gas mixture is passed through line 5 to the feed end of bed 1, in which the selectively adsorbable gas component of the mixture is adsorbed at a high adsorption pressure. The gas withdrawn from the product end of said bed 1 through line 6 comprises the gas component desired to be separated and purified in the PSA system. This gas, i.e., product effluent, from bed 1 passed from line 6 into product manifold 7 for delivery to an intended use or to storage.

Bed 2 is shown on countercurrent depressurization to its lower desorption pressure with blowdown gas being withdrawn from the feed end of the bed through line 8. Bed 3 is undergoing cocurrent depressurization to an intermediate pressure with release of void space gas from the product end thereof, through line 9 having valve 10 therein, directly into bed 4, which is initially at a lower pressure and is to be repressurized ultimately to the higher adsorption pressure.

As mentioned above, repressurization of each bed on a cyclic basis, e.g., bed 4, is carried out such that the last part thereof is performed only with product effluent gas. For this purpose, a portion of the product effluent is withdrawn from manifold 7 for passage to the bed for such repressurization purposes. To avoid discontinuity in the substantially uniform flow of product effluent from the PSA system, such product effluent is likewise withdrawn from manifold 7 during the repressurization of bed 4, i.e., by pressure equalization with bed 3. This product effluent gas passes, in accordance with established commercial practice, to said bed 4 during the indicated pressure equalization step. Thus, bed 4, and each bed in turn, is simultaneously repressurized substantially from a lower pressure to a higher intermediate pressure by both released void space gas from bed 3 and product effluent withdrawn from manifold 7.

In an illustrative theoretical example departing from conventional practice, it is assumed that bed 3 is at a higher pressure of 200 psig and that bed 4 is at 0 psig, its lower desorption pressure. Pressure equalization between the beds alone would occur at about 100 psig, after which bed 4 would be repressurized further, as with products effluent, to higher adsorption pressure, e.g., 200 psig. Void space gas remaining in bed 3 might be employed to provide purge for bed 2 at its lower desorption pressure, as by passage of additional void space gas from the product end of bed 3 to the product end of bed 2 through line 11. In a typical example, bed 3 might be depressurized from 100 psig to 50 psig in such a cocurrent depressurization-provide purge step, if employed.

In a realistic example consistent with conventional practice, however, some significant variation in the theoretical example above is known to occur, resulting in the somewhat lower product recovery obtained in conventional practice. As product effluent is passed from manifold 7 to bed 4, e.g., through line 12, for repressurization purposes simultaneously with the passage of void space gas from bed 3 to bed 4 for pressure equalization purposes, such pressure equalization will be found to occur, not at about 100 psig, but at a somewhat higher pressure, e.g., 110 psig. When bed 3 is further cocurrently depressurized, as in supplying purge gas to bed 2, the pressure of bed 3 at the end of such cocurrent depressurization-provide purge step will be found to be, not 50 psig, but a somewhat higher pressure, e.g. 60 psig. Upon countercurrent depressurization of bed 3, as this bed and the others pass through the PSA processing sequence on a cyclic basis, blowdown gas will be withdrawn from the feed end of bed 3 until the lower desorption pressure, e.g., 0 psig, is reached. Those skilled in the art will readily appreciate that the amount of the desired product gas contained in the blowdown gas released from an intermediate pressure of 60 psig will be greater than the amount of desired product gas lost upon blowdown from 50 psig. It is this effect that accounts for the indicated and known reduction in product recovery that occurs in conventional PSA practice.

In accordance with the practice of the invention, the undesired increase in the initial equalization pressure reached between beds 3 and 4 is obviated by diverting a portion of the withdrawn product effluent to external repressurization tank 13 during the pressure equalization step. For this purpose, product effluent is passed from line 12 to line 12a for passage to said repressurization tank simultaneously with the passage of released void space gas from bed 3 to bed 4. Upon completion of the pressure equalization step between beds 3 and 4, the product effluent in said repressurization tank 13 is passed therefrom through line 12b back to said line 12 for passage to bed 4 for repressurization together with an additional portion of product effluent withdrawn from bed 1 undergoing adsorption or from product manifold 7 receiving separated and purified product effluent from bed 1 during this stage of the processing cycle. It will be appreciated that various control valves will be included in the overall system, such as valve 14 for controlling passage of product effluent from manifold 7 through line 12, valves 15a and 15b for controlling the flow of product effluent into and out of repressurization tank 13, respectively, and valve 16 for controlling the passage of product effluent in line 12 directly to bed 4. Those skilled in the art will appreciate that variations in the gas flow control means can be made without departing from the scope of the invention as set forth in the appended claims. In this regard, means to accomplish the disclosed process flow sequence of the invention will be understood to include appropriate valves or other control means and supporting monitoring instrumentation as may be necessary to carry out the invention on a commercial basis. It will be understood that such control means are entirely conventional and known in the art, and do not form any part of the essential novelty of the invention as herein disclosed and claimed.

In the practice of the invention in the illustrative example, beds 3 and 4 are pressure equalized at 100 psig by the passage of void space gas from bed 3 through line 9, with valve 10 open, to bed 4. Product effluent simultaneously passes from manifold 7 through line 12 with valve 14 open, and through line 12a with valve 15a open, and 15b closed, to repressurization tank 13. Valve 16 is closed to prevent the flow of product effluent directly into bed 4 during the product equalization step, as occurs in conventional practice. Upon completion of the pressure equalization step, valves 15b and 16 can be opened, so as to permit product effluent to pass to bed 4, for repressurization purposes, from repressurization tank 13 and from manifold 7. Valve 15a can be closed during this stage of the repressurization.

The invention will thus be seen to permit continuous withdrawal of a portion of the product effluent, as in conventional practice, thus avoiding undesired discontinuity in the substantially uniform flow of product effluent from the PSA system. Product recovery is enhanced, however, by the pressure equalization between beds 3 and 4 at 100 psig, bed 3 reaching a pressure of about 50 psig if subsequently employed, as in conventional practice, to provide purge, e.g., to bed 2, by cocurrent depressurization. Subsequent countercurrent depressurization to lower desorption pressure, e.g., 0 psig, can be achieved without the incremental loss of product that necessarily occurs in conventional practice. In another embodiment of the invention, product recovery can be further enhanced by passing a minor portion of the released void space gas to the repressurization storage tank prior to introducing the major portion of said void space gas directly to the bed undergoing repressurization. The void space gas thus passed to the repressurization tank is subsequently passed, together with product effluent, to the bed undergoing repressurization upon completion of said pressure equalization step. While other amounts may be employed in particular embodiments, the minor amount of released void space gas passed to the repressurization tank will conveniently comprise from about 20% to about 30% by volume of the total amount of void space gas released upon completion of the combined withdrawal to repressurization tank-pressure equalization sequence.

In the illustrative example of the drawing, a portion of the released void space gas can be passed from bed 3 through line 17, having valve 18 therein, to line 12a and to repressurization tank 13. It will be understood that the portion of the product effluent being withdrawn from product manifold 7 can be stored in repressurization tank 13 during the time that said minor portion of released void space gas is being passed from bed 3 to said tank 13 as well as during the time such void space gas is being passed directly from bed 3 to bed 4 for pressure equalization purposes. The passage of void space gas from bed 3 to tank 13, constituting an indirect pressure equalization, can be accomplished, in the illustrative example, by opening valve 18 in line 17, and valve 15a in line 12a, with valve 14 being open and valves 15b and 16 being closed. Valve 10 in line 9 can likewise be closed during this time so that the minor portion of released void space gas passes to repressurization tank 13 for an initial period, e.g., about 6–20 seconds in various practical embodiments, before released void space gas is passed directly from bed 3 to bed 4 for pressure equalization purposes. It will be appreciated that, when this aspect of the invention is practiced, the repressurization tank will be of greater size than when such void space gas is not passed thereto. It will be appreciated that the need for additional piping and valves may be obviated in particular multi-bed arrangements in which a portion of the released void space gas from one bed can conveniently be passed through existing piping and valves for delivery to the repressurization tank.

With the diversion of a portion of the void space gas, otherwise passed from bed 3 directly to bed 4, to repressurization tank 13 as herein disclosed, pressure equalization between beds 3 and 4 could occur at a lower pressure, e.g., about 90 psig in the illustrative example. Subsequent use of additional void space gas released from bed 3 by cocurrent depressurization for providing purge, as to bed 2, may now result in a pressure reduction in bed 3 to about 40 psig instead of to 50 psig as described above. Upon countercurrent depressurization of bed 3 to its lower desorption pressure, e.g., 0 psig, less desired product gas will be lost, thereby further enhancing product recovery in the practice of the invention.

The pressure swing adsorption process and system herein described and claimed can be advantageously employed to selectively adsorb various components of practical, commercially available feed gas mixtures, thereby separating and purifying a desired product effluent gas. For example, the invention can be used to separate and purify hydrogen present as a major component of a feed gas mixture also containing carbon dioxide as a selectively adsorbable component, commonly together with one or more additional minor components to be removed as undesired impurities, such as nitrogen, argon, carbon monoxide, light saturated and unsaturated hydrocarbons, aromatics, light sulfur compounds and the like. Those skilled in the art will appreciate that the invention can also be advantageously employed for other desirable separations, such as the separation and purification of oxygen from air, methane purification from mixtures thereof with carbon dioxide, ammonia, hydrogen sulfide and the like.

The invention is applicable to multi-bed PSA systems such as those having at least three adsorbent beds undergoing, on a cyclic basis, the PSA processing sequence of higher pressure adsorption, cocurrent depressurization with release of void space gas for pressure equalization with another bed, as discussed above, and typically to provide purge for a bed at a lower pressure, countercurrent depressurization to a lower desorption pressure, and repressurization to higher adsorption pressure. In the PSA field, there are important applications for which a four bed, a five bed, a six bed or a larger system can advantageously be employed to affect a desired separation. As discussed above, the lower product recovery of conventional practice becomes increasingly significant as the number of beds in the PSA system is increased, because of the significantly higher repressurization rates that pertain as the number of beds is increased. A ten bed system will be found particularly advantageous in specific PSA separation operations although other number of beds, e.g. eight or nine beds, can readily be employed and may be preferable depending on the particular specifications and requirements of any given application. The invention overcomes the inherent loss of product that would occur in any such systems, thus enhancing the product recovery in multi-bed systems. The PSA process in general, and the invention in particular, can be carried out using any suitable adsorbent material having a selectivity for the impurity over the desired product gas. Suitable adsorbents include zeolitic molecular sieves, activated carbon, silica gel, activated alumina, and the like. Zeolitic molecular sieve adsorbents are generally desirable in the separation and purification of hydrogen contained in mixtures thereof with carbon dioxide and the like. Further information concerning suitable adsorbents, including such zeolitic molecular sieves, is contained in the Kiyonaga patent U.S. Pat. No. 3,176,444.

In many multi-bed PSA systems, the feed gas mixture is passed to at least two adsorbent beds at all stages of the processing cycle. The invention can readily be adapted, as will be appreciated by those skilled in the art, so that product effluent used for repressurization is passed to a repressurization tank during pressure equalization of a bed initially at a lower pressure and being repressured by void space gas from another bed. While the passage of feed gas to two adsorbent beds on adsorption at any given time is commonly employed, the maintaining of three or even more beds on adsorption, on a cyclic basis, at all stages of the process is within the contemplation of the invention.

It is also within the scope of the invention, as in conventional practice, to employ two or more pressure equalization steps in addition to that described herein with respect to the novel feature of the invention. Thus, each bed may undergo pressure equalization with the void space gas released from another bed or beds, to reach a lower intermediate pressure, prior to the pressure equalization of each said bed from such lower pressure to the intermediate pressure as described above with respect to a one pressure equalization embodiment of the invention.

Various systems having a variety of combinations of number of beds, beds on adsorption at any time, and pressure equalization steps, can thus be employed in the practice of the invention. One such system, referred to for illustrative purposes only, has ten beds, with three beds on adsorption at all stages, four pressure equalization steps, and the use of an external repressurization tank in accordance with the invention. Each bed, in appropriate sequence, undergoes adsorption, four pressure equalization steps, passage of product gas to the external repressurization tank, countercurrent depressurization, purge, repressurization by said four pressure equalization steps and final repressurization. Those skilled in the art will appreciate that numerous processing variations can be made within the overall scope of any such cycle depending on the particular circumstances of any given application. Thus, void space gas released from a bed may be employed to provide purge to another bed following the use of such released gas for pressure equalization purposes, or at an intermediate stage before all pressure equalizations have been completed. Using a system such as the ten bed system referred to above, it has been determined that an improvement in product recovery of one or two percent can be realized, as in the recovery of purified hydrogen product from hydrogen-containing feed gas mixtures containing carbon dioxide. Similar recovery improvements can be achieved in other embodiments of the invention.

The invention thus contributes significantly to the technical and economic attractiveness of the PSA process and system. This highly desirable improvement in product recovery is achieved without causing discontinuity in the substantially uniform flow of product effluent from the PSA system. The invention achieves, thereby, a desirable advance in the art, while maintaining compatibility with the practical requirements for continuous product delivery in commercial PSA systems.

What is claimed is:

1. In a pressure swing adsorption process for the selective adsorption of at least one gas component from a feed gas mixture in an adsorption system having at least three adsorbent beds, each of which undergoes, on a cyclic basis, higher pressure adsorption, cocurrent depressurization to intermediate pressure with release of void space gas from the bed, countercurrent depressurization to a lower desorption pressure, and repressurization to said higher pressure, and in which the void space gas released from one bed is passed to the product end of another bed initially at a lower pressure to equalize the pressure therebetween, said other bed also being repressurized by a portion of the product effluent withdrawn from a bed undergoing adsorption at said higher pressure, the improvement comprising:
    (a) introducing released void space gas to be used for said pressure equalization purposes directly into the bed undergoing repressurization to equalize the pressure between the beds at an intermediate pressure;
    (b) simultaneously passing a portion of the product effluent withdrawn from a bed undergoing adsorption at said higher pressure to an external repressurization storage tank; and
    (c) upon completion of said pressure equalization, passing said gas from said repressurization storage tank to said bed undergoing repressurization, together with an additional portion of product effluent withdrawn from a bed undergoing adsorption at said higher pressure, whereby product recovery is enhanced without discontinuity in the substantially uniform flow of product effluent from the adsorption system.

2. The process of claim 1 in which said feed gas mixture is passed, on a cyclic basic, to four adsorbent beds.

3. The process of claim 1 in which said feed gas mixture is passed, on a cyclic basis, to five or six adsorbent beds.

4. The process of claim 3 in which feed gas is passed to two adsorbent beds at all stages of the processing cycle.

5. The process of claim 3 in which said bed undergoing repressurization is pressure equalized with the void space gas released from another bed to a lower intermediate pressure prior to the pressure equalization of said bed to said intermediate pressure.

6. The process of claim 1 in which said feed mixture is passed, on a cyclic basis, to seven or more adsorbent beds.

7. The process of claim 6 in which feed gas is passed to at least two adsorbent beds at all stages of the processing cycle.

8. The process of claim 7 in which, prior to said pressure equalization at said intermediate pressure, each bed undergoes two pressure equalization steps to lower intermediate pressures.

9. The process of claim 8 in which said feed gas mixture is passed, on a cyclic basis, to nine or ten adsorbent beds.

10. The process of claim 9 and including a fourth pressure equalization step for each bed prior to said final repressurization.

11. The process of claim 7 in which the product effluent comprises hydrogen and the selectively adsorbed component comprises carbon dioxide.

12. The process of claim 1 and including passing a minor portion of the released void space gas to be used for said pressure equalization purposes to said repressurization storage tank prior to introducing the major portion of said void space gas directly into the bed undergoing repressurization, and introducing said void space gas from the repressurization storage tank, together with product effluent, into the bed undergoing repressurization subsequent to said introduction of said major portion of the void space gas directly into said bed.

13. In a pressure swing adsorption system of at least three adsorbent beds for the selective adsorption of at least one gas component from a feed gas mixture, said system having conduit means for withdrawing product effluent from each bed at a higher adsorption pressure, on a cyclic basis, and for withdrawing a portion of said product effluent for delivery to an other bed undergoing repressurization from a lower pressure to said higher adsorption pressure, and conduit means for passing void space gas released from each bed, on a cyclic basis, to an other bed undergoing said repressurization for pressure equalization to an intermediate pressure, the improvement comprising:

(a) an external repressurization storage tank;
(b) means for passing said withdrawn portion of the product effluent to the repressurization tank for delivery to a bed undergoing repressurization; and
(c) means for passing product effluent from the repressurization tank to an other bed undergoing repressurization, on a cyclic basis, said means providing for the passage of said product effluent to said other bed subsequent to the repressurization of said bed from a lower pressure to an intermediate pressure by pressure equalization with a bed undergoing depressurization, whereby product recovery is enhanced without discontinuity in the substantially uniform flow of product effluent from the adsorption system.

14. The system of claim 13 in which four adsorbent beds are incorporated into said system.

15. The system of claim 13 in which five or six adsorbent beds are incorporated into said system.

16. The system of claim 13 in which at least seven adsorbent beds are incorporated into said system.

17. The system of claim 16 and including means for passing feed gas to two adsorbent beds at all stages of the processing cycle.

18. The system of claim 17 and including means for pressure equalizing said other bed undergoing repressurization, on a cyclic basis, to two lower intermediate pressures prior to said pressure equalization from such lower pressure to said intermediate pressure and the passage of product effluent from the repressurization tank to said other bed.

19. The system of claim 18 in which eight or nine adsorbent beds are incorporated into said system.

20. The system of claim 18 in which ten adsorbent beds are incorporated into said system.

21. The system of claim 13 and including means for passing void space gas from each bed, on a cyclic basis, to said repressurization tank.

22. The system of claim 17 and including means for passing void space gas from each bed, on a cyclic basis, to said repressurization tank.

* * * * *